M. L. PEASLEY & T. A. PENCE.
AUTOSLED.
APPLICATION FILED MAR. 6, 1917.

1,257,735.

Patented Feb. 26, 1918.
2 SHEETS—SHEET 1.

Inventor
Mark L. Peasley
and
Thomas A. Pence

By Herbert E. Ouint
Attorney

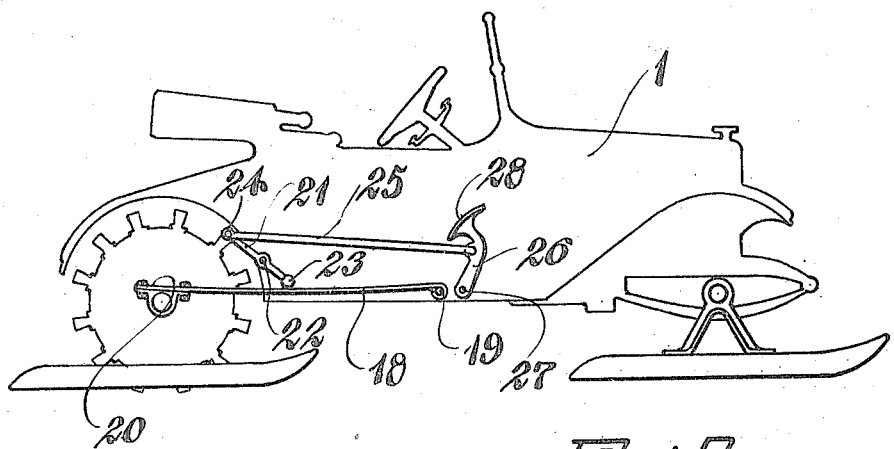
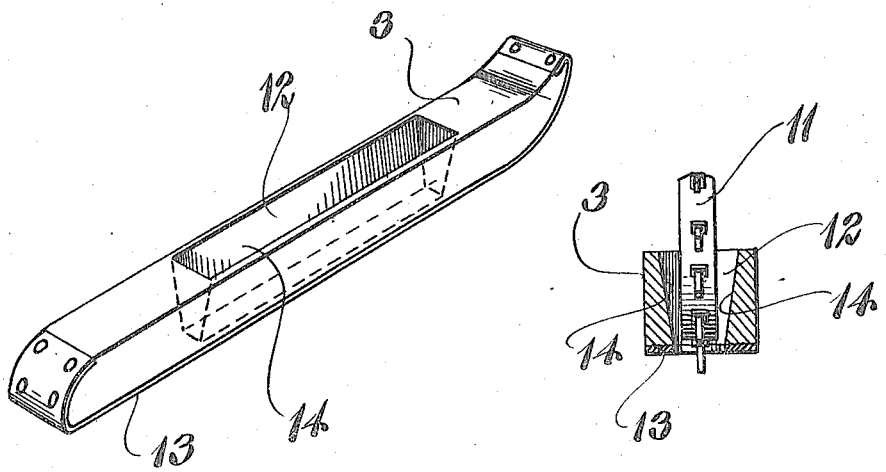

UNITED STATES PATENT OFFICE.

MARK L. PEASLEY, OF FISHTRAP, AND THOMAS A. PENCE, OF CHENEY, WASHINGTON.

AUTOSLED.

1,257,735.  Specification of Letters Patent.  Patented Feb. 26, 1918.

Application filed March 6, 1917. Serial No. 152,653.

*To all whom it may concern:*

Be it known that we, MARK L. PEASLEY, a citizen of the United States, residing at Fishtrap, in the county of Lincoln and State of Washington, and THOMAS A. PENCE, a citizen of the United States, residing at Cheney, in the county of Spokane and State of Washington, have invented certain new and useful Improvements in Autosleds, of which the following is a specification.

Our invention relates to improvements in auto sleds and more particularly to equipping the ordinary automobile with runners and to provide a driving means whereby the mechanism of the auto will be fully used in propelling the sled thus formed.

One object of our invention resides in the provision of an auto sled wherein the runners will track in the standard gage wagon or auto track, and by which means we provide a well packed surface contact for our driving means.

Another object of our invention resides in supporting the weight that usually comes upon the rear axle upon the runners and eliminating that weight from the axle mechanism by which means we are enabled to provide a driving means whereby said means will always be in frictional engagement with the ground surface irrespective of the contour and which will allow of free axial movement of the runners upon an independent supporting axle.

Further than this we aim to provide an efficient and practical device of the foregoing character embodying certain improved novel and meritorious features of construction which will be hereinafter full set four and described, recourse being had to the accompanying drawings, in which—

Fig. 3 is an outlined view of our structure showing the manner of adding weight to the drivers to force the spikes into the snow.

Fig. 4 is a perspective of the rear runners of our construction.

Fig. 5 is a transverse section through said runners taken about midway of its ends.

Figure 1:
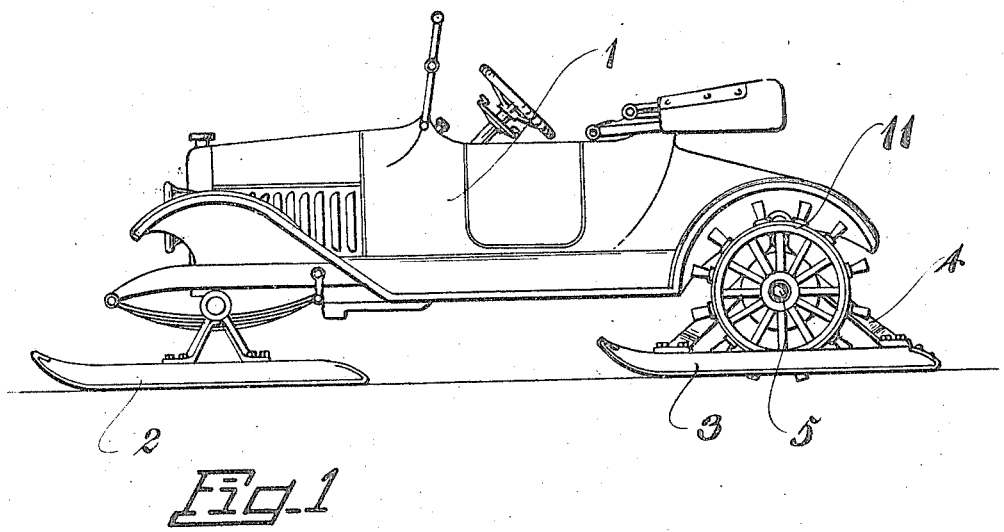
Figure 1 is a side view of an auto with the wheels removed, runners mounted thereon, and with a spike driving wheel taking the place of the usual rear wheel.
Figure 2:
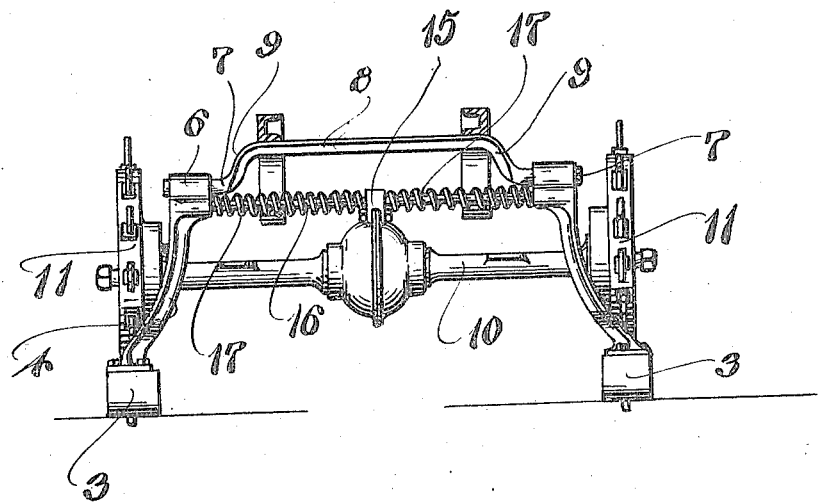
Fig. 2 is a partial rear elevation of our device showing the attachment features used in converting an auto into a self-propelled sleigh.

Referring more particularly to the drawing, in which like characters of reference are used to indicate like parts in the several views, the numeral 1 designates an auto body of the usual type provided with sled runners 2 fitted upon the front axles in place of the usual wheels. 3 is the rear runner supported to track with the forward runners and provided with bracing arms 4 terminating somewhat above the main axle 5 of the car and provided with a hub 6 for engagement with a shaft end 7. The shaft 8 of which 7 is one end, is rigidly secured to the auto body and the usual rear springs are removed. The shaft 8 is provided with bends 9 terminating in the ends 7 to place the shaft as closely as possible to the rear drive axle of the car, but not spaced sufficiently far away to allow necessary perpendicular movement of the car axle which we designate 10. The arms 4 are formed so that their engagement with the axle 8 is somewhat close to the body and are provided outspread at the bottom so as to maintain the runners of standard gage. The hub 6 of the runner arms 4 is mounted for free axial movement of the runner so as to provide easy movement over rough ground.

Upon the spindles of the rear axle 10 where the wheels have been removed are mounted spiked wheels 11 which are also spaced according to the standard gage for autos and which take the place of the usual wheels mounted upon the car. As the runners are of the same gage and the wheels are mounted directly in line with them we have provided upon each rear runner a longitudinal slot 12 tapering downward and providing an opening through the shoe 13 through which slot the spiked wheels will have access to the ground for purposes of driving the sled thus formed. The slotted portion 12 provides the walls 14 slanting and this slant is utilized to maintain the driving wheels in as near a true alinement as possible.

When the sled is being operated over uneven ground the runners will tend to smooth out the path and eliminate the roughness of the road to a certain extent, but by reason of the small road surface of the driving wheels it is necessary that they absolutely follow the contour of the ground. This will cause a constant up and down movement and in the case of being on a side hill or slope will have a tendency to shift the runners from a true line with respect to the driving wheels.

By providing the sloping side walls 14 when the driving wheel engages with one side or the other thereof, it will be directed again to the center of the opening or slot in the shoe 13 through which the spikes operate to propel the vehicle. To further maintain a balance and true alinement of the runners and driving wheels, we provide upon the axle differential housing at 15 an upstanding spring-engaging block provided to support a rod 16 secured to the hubs 6 on its ends. Over the rod 16 are expansive coil springs 17 each providing an equal pressure and which will allow of a slight side movement of the driving wheels with respect to the runners, but on the whole, will serve to maintain both in a true relation.

In cases where the ground is extremely hard and the spikes do not enter sufficiently to give full thrust we have provided a depressing means consisting of spring members 18 pivotally secured at 19 to the body of the vehicle and at 20 to the rear axle of the car. Upon the body 1 we pivotally mount a depression lever 21 supported at 22 and provided with means 23 for engaging the spring 18. Upon the end 24 we pivotally connect with a link 25 passing forward of the body and engaging with the foot lever 26 pivotally mounted at 27 and with the tread 28 thereof convenient to the foot of the operator. By reason of supporting one end of the spring member 18 upon the body and the other member upon the axle and pressing forward upon the foot lever we are able to throw considerable tension upon the spring 18 to hold the driving wheels 11 firmly to the ground and force the spikes into the ground as by this means we are enabled to place thereon a portion of the weight of the body itself to secure a firm footing for the drivers.

While we have particularly described the elements best adapted to perform the functions set forth, it is obvious that various changes in the form proportion and in the minor details of construction may be resorted to, without departing from the spirit or sacrificing any of the principles of the invention.

We claim:

1. In a motor sled, the combination with a motor body including the rear axle, of a shaft mounted on said body directly over the rear axle and supporting rear runners, said runners independently supporting the rear of said body and spike wheels mounted on the rear axle and contacting with the ground through a slot in the rear runners, said rear axle being independent of attachment to the rear of said body and capable of self-adjustment to the unevenness of the ground, and means whereby the wheels are flexibly supported centrally of the slot in the runners.

2. A sled attachment for autos consisting of a pair of slotted runners, slotted metal shoes therefor, supporting brackets secured to the runners and provided for axial connection to a shaft rigidly secured to the auto body, spring means connecting with said brackets and the driving axle to maintain the drive wheels centrally of the slots in the runners.

3. An automobile runner comprising a body with an up-curved forward end, a central longitudinal slot therein, having beveled walls converging toward the bottom, a drive wheel mounted to operate through said slot and contacting with the sides thereof to be directed for contact with the ground.

4. In an auto sleigh, the combination with a body having a rear axle, of rear runners axially mounted to said body independently of the rear axle, of spiked wheels mounted on the rear axle and engaging the ground through a slot in the rear runners, spring tension members secured to the axle and to the body forward of the axle and acted upon by depressing members controlled from the foot board to throw the weight of the body upon the axle.

In testimony whereof we affix our signatures.

MARK L. PEASLEY.
THOMAS A. PENCE.

Copies of this patent may be obtained for five cents each, by addressing the "Commissioner of Patents, Washington, D. C."